(12) United States Patent
Hong (10) Patent No.: US 11,022,738 B2
(45) Date of Patent: Jun. 1, 2021

(54) HEAD-UP DISPLAY SYSTEM AND METHOD FOR CONTROLLING THE SAME

(71) Applicant: BOE TECHNOLOGY GROUP CO., LTD., Beijing (CN)

(72) Inventor: Tao Hong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 348 days.

(21) Appl. No.: 16/043,284

(22) Filed: Jul. 24, 2018

(65) Prior Publication Data
US 2019/0204491 A1 Jul. 4, 2019

(30) Foreign Application Priority Data

Jan. 2, 2018 (CN) .......................... 201810002190.9

(51) Int. Cl.
*G02B 5/30* (2006.01)
*G02B 27/01* (2006.01)
*G02F 1/01* (2006.01)
*G02B 30/40* (2020.01)
*G02B 27/09* (2006.01)

(52) U.S. Cl.
CPC ......... *G02B 5/3083* (2013.01); *G02B 5/3016* (2013.01); *G02B 27/0101* (2013.01); *G02B 27/0977* (2013.01); *G02B 30/40* (2020.01); *G02F 1/0134* (2013.01); *G02B 5/30* (2013.01); *G02B 2027/014* (2013.01); *G02B 2027/0185* (2013.01)

(58) Field of Classification Search
None
See application file for complete search history.

(56) References Cited

U.S. PATENT DOCUMENTS

2014/0028933 A1* 1/2014 Chen .................... H04N 13/305
349/15
2017/0261746 A1* 9/2017 Tam ..................... H04N 13/332
(Continued)

FOREIGN PATENT DOCUMENTS

CN 201181368 Y 1/2009
CN 105988228 A 10/2016
(Continued)

OTHER PUBLICATIONS

First Office Action for Chinese Patent Application No. 201810002190.9 dated Jan. 19, 2020.

*Primary Examiner* — Derek S. Chapel
(74) *Attorney, Agent, or Firm* — Calfee, Halter & Griswold LLP (57) ABSTRACT

A head-up display system includes a display control component, a polarization conversion member, a birefringent lens component, a scattering component, and a reflecting component; the display control component is configured to alternately output a first to-be-displayed image and a second to-be-displayed image to the polarization conversion member; the polarization conversion member is configured to convert light having different polarization states; the birefringent lens component is configured to image light of a P-polarization state and a S-polarization state; the scattering component is configured to scatter formed images onto the reflecting component, respectively; and the reflecting component is configured to reflect the images to an eye of a user.

18 Claims, 3 Drawing Sheets

(56) References Cited

U.S. PATENT DOCUMENTS

| | | | | |
|---|---|---|---|---|
| 2017/0357088 A1* | 12/2017 | Matsuzaki | ............ | B60K 35/00 |
| 2020/0201036 A1* | 6/2020 | Hong | ..................... | G02B 30/00 |
| 2020/0209960 A1* | 7/2020 | Hong | ..................... | G06F 3/013 |

FOREIGN PATENT DOCUMENTS

| | | | |
|---|---|---|---|
| CN | 205899144 U | | 1/2017 |
| CN | 107203042 A | | 9/2017 |
| JP | H06273691 A | | 9/1994 |

* cited by examiner

In a display cycle, alternately output a first to-be-displayed image and a second to-be-displayed image to a polarization conversion member on the basis of a preset timing ⎯ 501

During a first time period of the display cycle, convert light of the first to-be-displayed image into S-polarized light by the polarization conversion member, image the first to-be-displayed image which has been converted into the S-polarized light on a scattering component by a birefringent lens component, to form an object surface of a first projection plane, scatter the object surface of the first projection plane onto a reflecting component by the scattering component, and reflect the object surface of the first projection plane, which is scattered onto the reflecting component, to human eyes by the reflecting component to provide the human eyes with a display image formed on the first projection plane ⎯ 502

During a second time period of the display cycle, convert light of the second to-be-displayed image into P-polarized light by the polarization conversion member, image the second to-be-displayed image which has been converted into the P-polarized light on the scattering component by the birefringent lens component, to form an object surface of a second projection plane, scatter the object surface of the second projection plane onto the reflecting component by the scattering component, and reflect the object surface of the second projection plane, which is scattered onto the reflecting component, to the human eyes by the reflecting component to provide the human eyes with a display image formed on the second projection plane ⎯ 503

Fig. 5

HEAD-UP DISPLAY SYSTEM AND METHOD FOR CONTROLLING THE SAME

CROSS-REFERENCE TO RELATED APPLICATIONS

This application claims the priority to Chinese Patent Application No. 201810002190.9 filed on Jan. 2, 2018, entitled "head-up display system and method for controlling the same", the entire contents of which are incorporated herein by reference.

TECHNICAL FIELD

The present disclosure relates to the field of display technology, and more particular, to a head-up display system and a method for controlling the same.

BACKGROUND

Head Up Display (HUD) has gradually gained a wide application in the automotive field. The head-up display projects important information including information such as navigation displayed on an instrument board during travelling of a vehicle onto a front windshield glass, in this way, a driver does not have to look down to see the information in the instrument board, which helps a fresh hand, who lacks experience in speed judgment, to control a speed of the vehicle, so as to avoid vehicle violation due to overspeed in many speed-limiting road sections, and more importantly, to allow the driver to instantaneously read without shifting large field of vision, to keep a clear mind and remain in the best condition for observation, thus avoiding an accident caused when the driver looks down to see instrument board display or audio display and there is not enough time for the driver to take effective measures in case of an emergency appears in front.

In a conventional head-up display system, a 2D display image is projected at a fixed distance in front of the driver, and when the driver looks at the display image of the head-up display, the driver needs to adjust the focus distance of the eyes so that the eyes may focus on a projection plane of the 2D display.

However, viewing a display image on the projection plane at a fixed focal length for a long time can cause the driver's eye fatigue, which is not conducive to safe driving; meanwhile, some image information of the head-up display, such as staring information while navigating, superimposed information of other markers, etc., cannot be perfectly displayed by the 2D display image.

It should be noted that the foregoing information disclosed in Background are only for the purpose of enhancement of the understanding of the background of the present disclosure and therefore the information can include information that does not constitute the prior art already known to those of ordinary skill in the art.

SUMMARY

At least one of the present disclosure discloses a head-up display system including a display control component, a polarization conversion member, a birefringent lens component, a scattering component, and a reflecting component;

the display control component is configured to alternately output a first to-be-displayed image and a second to-be-displayed image to the polarization conversion member on the basis of a preset timing;

the polarization conversion member is configured to convert light of the first to-be-displayed image into S-polarized light, and convert light of the second to-be-displayed image into P-polarized light to be incident to the birefringent lens component;

the birefringent lens component is configured to image the first to-be-displayed image which has been converted into the S-polarized light on the scattering component to form an object surface of a first projection plane, and image the second to-be-displayed image which has been converted into the P-polarized light on the scattering component to form an object surface of a second projection plane;

the scattering component is configured to scatter the object surface of the first projection plane and the object surface of the second projection plane onto the reflecting component, respectively; and the reflecting component is configured to reflect the object surface of the first projection plane and the object surface of the second projection plane, which are scattered onto the reflecting component, to an eye of a user.

In an exemplary embodiment, the display control component includes a system control unit, an image rendering unit and a display member; the system control unit is electrically connected to the image rendering unit, and the image rendering unit is electrically connected to the display member;

the image rendering unit is configured to render the first to-be-displayed image according to first to-be-displayed image data, and render the second to-be-displayed image according to second to-be-displayed image data;

the system control unit is configured to control the image rendering unit to alternately send the first to-be-displayed image and the second to-be-displayed image to the display member on the basis of the preset timing; and the display member is configured to alternately output the first to-be-displayed image and the second to-be-displayed image.

In an exemplary embodiment, the system control unit is further electrically connected to the polarization conversion member, and is configured to control the polarization conversion member to switch a polarization state on the basis of the preset timing, and the polarization state includes a S-polarization state or a P-polarization state.

In an exemplary embodiment, the scattering component includes a polymer dispersed liquid crystal component and a voltage control unit;

the voltage control unit is electrically connected to the polymer dispersed liquid crystal component and the system control unit, respectively, for controlling the polymer dispersed liquid crystal component to switch a state on the basis of the preset timing under the control of the system control unit, the state including a transparent state or a scattering state.

In an exemplary embodiment, the birefringent lens component includes a first birefringent lens and a second birefringent lens disposed in parallel to each other; optical axises of crystal of the first birefringent lens and the second birefringent lens are perpendicular to each other, and the first birefringent lens refracts the S-polarized light, and the second birefringent lens refracts the P-polarized light.

In an exemplary embodiment, the polymer dispersed liquid crystal component includes a first polymer dispersed liquid crystal member and a second polymer dispersed liquid crystal member disposed in parallel to each other;

the first birefringent lens is configured to image the first to-be-displayed image which has been converted into the S-polarized light on the first polymer dispersed liquid crystal member, and the second birefringent lens is configured to image the second to-be-displayed image which has been converted into the P-polarized light on the second polymer dispersed liquid crystal member.

In an exemplary embodiment, the reflecting component includes a first reflector, a second reflector, and a third reflector;

the first reflector is configured to reflect the object surface of the first projection plane and the object surface of the second projection plane, which are scattered onto the first reflector, to the second reflector;

the second reflector is configured to reflect the light emitted from the first reflector to the third reflector; and the third reflector is configured to reflect the light emitted from the second reflector to an eye of a user.

The present disclosure also discloses a method for controlling a head-up display system including:

in a display cycle, alternately outputting a first to-be-displayed image and a second to-be-displayed image to a polarization conversion member on the basis of a preset timing;

during a first time period of the display cycle, converting light of the first to-be-displayed image into S-polarized light by the polarization conversion member, imaging the first to-be-displayed image which has been converted into the S-polarized light on a scattering component by a birefringent lens component, to form an object surface of a first projection plane, scattering the object surface of the first projection plane onto a reflecting component by the scattering component, and reflecting the object surface of the first projection plane, which is scattered onto the reflecting component, to an eye of a user by the reflecting component to provide the an eye of a user with a display image formed on a first projection plane;

during a second time period of the display cycle, converting light of the second to-be-displayed image into P-polarized light by the polarization conversion member, imaging the second to-be-displayed image which has been converted into the P-polarized light on the scattering component by the birefringent lens component, to form an object surface of a second projection plane, scattering the object surface of the second projection plane onto the reflecting component by the scattering component, and reflecting the object surface of the second projection plane, which is scattered onto the reflecting component, to the an eye of a user by the reflecting component to provide the an eye of a user with a display image formed on a second projection plane.

In an exemplary embodiment, the method further includes:

outputting the first to-be-displayed image to the polarization conversion member in a 2D display mode;

converting the light of the first to-be-displayed image into the S-polarized light by the polarization conversion member;

imaging the first to-be-displayed image which has been converted into the S-polarized light on the scattering component by the birefringent lens component, to form the object surface of the first projection plane;

scattering the object surface of the first projection plane onto the reflecting component by the scattering component;

reflecting the object surface of the first projection plane, which is scattered onto the reflecting component, to an eye of a user by the reflecting component to provide an eye of a user with the display image formed on the first projection plane.

In an exemplary embodiment, the method further includes:

outputting the second to-be-displayed image to the polarization conversion member in a 2D display mode;

converting the light of the second to-be-displayed image into the P-polarized light by the polarization conversion member;

imaging the second to-be-displayed image which has been converted into the P-polarized light on the scattering component by the birefringent lens component, to form the object surface of the second projection plane;

scattering the object surface of the second projection plane onto the reflecting component by the scattering component; and reflecting the object surface of the second projection plane, which is scattered onto the reflecting component, to an eye of a user by the reflecting component to provide an eye of a user with the display image formed on the second projection plane.

In an exemplary embodiment, the birefringent lens component includes a first birefringent lens and a second birefringent lens disposed in parallel to each other; the scattering component includes a polymer dispersed liquid crystal component and a voltage control unit, wherein the polymer dispersed liquid crystal component includes a first polymer dispersed liquid crystal member and a second polymer dispersed liquid crystal member disposed in parallel to each other;

when light incident to the first birefringent lens is the S-polarized light, a state of the first polymer dispersed liquid crystal member is set as a scattering state, and a state of the second polymer dispersed liquid crystal member is set as a transparent state; and when light incident to the second birefringent lens is P-polarized light, the state of the first polymer dispersed liquid crystal member is set as the transparent state, and the state of the second polymer dispersed liquid crystal member is set as the scattering state.

In an exemplary embodiment, when the voltage control unit inputs a voltage signal to the first polymer dispersed liquid crystal member and the second polymer dispersed liquid crystal member, the states of the first polymer dispersed liquid crystal member and the second polymer dispersed liquid crystal member are the transparent state; and when the voltage control unit does not input any voltage signal to the first polymer dispersed liquid crystal member and the second polymer dispersed liquid crystal member, the states of the first polymer dispersed liquid crystal member and the second polymer dispersed liquid crystal member are the scattering state.

In an exemplary embodiment, the display cycle is less than 1/30 second.

BRIEF DESCRIPTION OF THE DRAWINGS

FIG. 5 is a flow chart showing a method for controlling a head-up display system according to an embodiment of the present disclosure.

DETAILED DESCRIPTION

In order to make the above-described objects, features, and advantages of the present disclosure clearer and easier to understand, the present disclosure will be further described in detail with reference to the accompanying drawings and specific embodiments.

Figure 1:
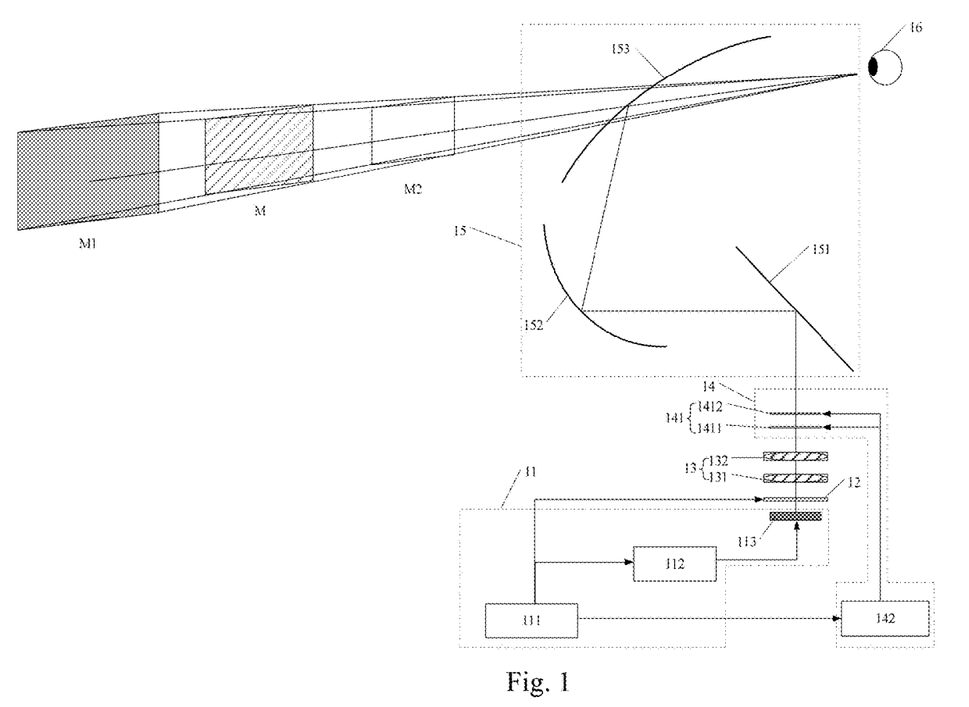
FIG. 1 is a schematic diagram illustrating a head-up display system according to an embodiment of the present disclosure.

FIG. 1 is a schematic diagram illustrating a head-up display system according to an embodiment of the present disclosure.

The embodiment of the present disclosure provides a head-up display system including a display control component 11, a polarization conversion member 12, a birefringent lens component 13, a scattering component 14 and a reflecting component 15; wherein the display control component 11 is configured to alternately output a first to-be-displayed image and a second to-be-displayed image to the polarization conversion member 12 on the basis of a preset timing; the polarization conversion member 12 is configured to convert light of the first to-be-displayed image into S-polarized light and convert light of the second to-be-displayed image into P-polarized light to be incident to the birefringent lens component 13; the birefringent lens component 13 is configured to image the first to-be-displayed image, which has been converted into the S-polarized light, on the scattering component 14, to form an object surface of a first projection plane, and image the second to-be-displayed image, which has been converted into the P-polarized light, on the scattering component 14, to form an object surface of a second projection plane; the scattering component 14 is configured to scatter the object surface of the first projection plane and the object surface of the second projection plane onto the reflecting component 15, respectively, and the reflecting component 15 is configured to reflect the object surface of the first projection plane and the object surface of the second projection plane, which are scattered onto the reflecting component 15, to an observation point, for example an eye 16 of a user.

It shall be noted that the object surface of the first projection plane and the object surface of the second projection plane formed on the scattering component 14 are scattered onto the reflecting component 15 and reflected by the reflecting component 15 to such as an eye 16 of a user so a user may view display images of a first projection plane M1 and a second projection plane M2. In an optical imaging system, the first projection plane M1 is an image surface corresponding to the object surface of the first projection plane formed on the scattering component 14, and the second projection plane M2 is an image surface corresponding to the object surface of the second projection plane formed on the scattering component 14, and both the display images of the first projection plane and the second projection plane are virtual images.

Light field display is achieved by depth fusion of the display images of the first projection plane M1 and the second projection plane M2. The light field display is a natural 3D display mode, it may realistically display a 3D object and provide image information of different depths, so that a focus distance of the user's eyes may be adjusted to avoid discomfort caused by focusing on a plane for a long time.

Depth fusion light field display is to display images on the first projection plane M1 and the second projection plane M2 that are spaced apart from each other at a certain distance in space, the display image on the first projection plane M1 and the display image on the second projection plane M2 are rendered, so that a depth perception plane M of the eye of a user changes within a certain range, and the user's focal plane changes, thereby a natural 3D display is formed. The depth perception plane M of the eye of a user is located between the first projection plane M1 and the second projection plane M2.

The display control component 11 includes a system control unit 111, an image rendering unit 112, and a display member 113; wherein the system control unit 111 is electrically connected to the image rendering unit 112, and the image rendering unit 112 is electrically connected to the display member 113; the image rendering unit 112 is configured to render a first to-be-displayed image according to first to-be-displayed image data and to render a second to-be-displayed image according to second to-be-displayed image data; the system control unit 111 is configured to control the image rendering unit 112 to alternately send the first to-be-displayed image and the second to-be-displayed image to the display member 113 on the basis of the preset timing; and the display member 113 is configured to alternately output the first to-be-displayed image and the second to-be-displayed image.

The image rendering unit 112 receives the first to-be-displayed image data and the second to-be-displayed image data inputted by an external system, renders the first to-be-displayed image according to the first to-be-displayed image data, and renders the second to-be-displayed image according to the second to-be-displayed image data.

The system control unit 111 controls the image rendering unit 112 to alternately send the rendered first to-be-displayed image and the rendered second to-be-displayed image to the display member 113 on the basis of a preset timing, and the display member 113, after receiving the first to-be-displayed image and the second to-be-displayed image sent from the image rendering unit 112, alternately displays the first to-be-displayed image and the second to-be-displayed image on the basis of a preset timing, and alternately outputs the first to-be-displayed image and the second to-be-displayed image to the polarization conversion member 12.

For example, during a first time period of a display cycle, the system control unit 111 controls the image rendering unit 112 to send the first to-be-displayed image to the display member 113, and the display member 113 displays the first to-be-displayed image and outputs the first to-be-displayed image to the polarization conversion member 12; and during a second time period of a display cycle, the system control unit 111 controls the image rendering unit 112 to send the second to-be-displayed image to the display member 113, and the display member 113 displays the second to-be-displayed image, and outputs the second to-be-displayed image to the polarization conversion member 12.

The system control unit 111 is also electrically connected to the polarization conversion member 12 for controlling the polarization conversion member 12 to switch a polarization state on the basis of the preset timing, wherein the polarization state includes a S-polarization state or a P-polarization state.

On the basis of the preset timing based on which the first to-be-displayed image and the second to-be-displayed image are outputted from the display member 113 to the polarization conversion member 12, the polarization state of the polarization conversion member 12 is switched accordingly, so that light passing through the polarization conversion member 12 is converted into S-polarized light or P-polarized light, and then the S-polarized light and the P-polarized light are incident to the birefringent lens component 13 on the basis of a preset timing.

For example, during a first time period of a display cycle, the display member 113 outputs the first to-be-displayed image to the polarization conversion member 12, and the system control unit 111 switches the polarization state of the polarization conversion member 12 to the S-polarization state so that light of the first to-be-displayed image passing through the polarization conversion member 12 is converted into the S-polarized light; during a second time period of a display cycle, the display member 113 outputs the second to-be-displayed image to the polarization conversion member 12, and the system control unit 111 switches the polarization state of the polarization conversion member 12 to the P-polarization state, so that light of the second to-be-displayed image passing through the polarization conversion member 12 is converted into the P-polarized light.

It should be noted that, the polarization conversion member 12 can be an electro-optical crystal, and the system control unit 111 changes a polarization state of the electro-optical crystal by applying different voltages thereto.

The birefringent lens component 13 includes a first birefringent lens 131 and a second birefringent lens 132 which are disposed in parallel to each other, wherein optical axises of crystal of the first birefringent lens 131 and the second birefringent lens 132 are perpendicular to each other, and the first birefringent lens 131 refracts the S-polarized light, and the second birefringent lens 132 refracts the P-polarized light.

By disposing the first birefringent lens 131 and the second birefringent lens 132 the optical axises of crystal of which are perpendicular to each other, the first birefringent lens 131 refracts the S-polarized light, but does not refract the p-polarized light, and the second birefringent lens 132 refracts the P-polarized light but does not refract the S-polarized light.

It should be noted that both the first birefringent lens 131 and the second birefringent lens 132 include a birefringent material and a filling material, wherein the filling material is a material having a single refractive index, which does not change along with a polarization state of light, and the refractive index of the filling material is equal to a lower one of two refractive indices of the birefringent material.

Figure 2:
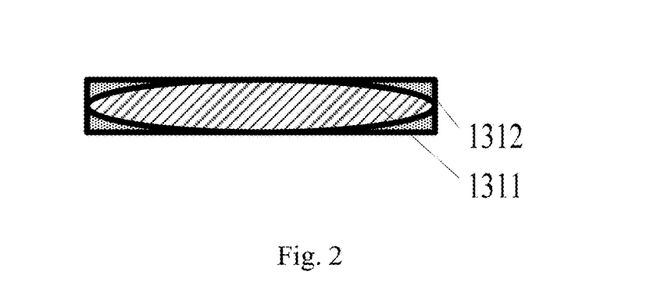
FIG. 2 is a schematic structural diagram illustrating a first birefringent lens according to an embodiment of the present disclosure.

FIG. 2 is a schematic structural diagram illustrating a first birefringent lens according to an embodiment of the present disclosure.

The first birefringent lens 131 includes a first birefringent material 1311 and a first filling material 1312, wherein a refractive index of the first birefringent material 1311 with respect to S-polarized light is greater than a refractive index of the first birefringent material 1311 with respect to P-polarized light, and a refractive index of the first filling material 1312 is equal to the refractive index with regard to the P-polarized light. When the S-polarized light passes through the first birefringent lens 131, the refractive index of the first birefringent material 1311 is greater than the refractive index of the first filling material 1312, and the first birefringent lens 131 can refract the S-polarized light; and when the P-polarized light passes through the first birefringent lens 131, since the refractive index of the first birefringent material 1311 is equal to the refractive index of the first filling material 1312, the first birefringent lens 131 does not reflect the S-polarized light.

Therefore, the first birefringent lens 131 refracts only the S-polarized light but does not refract the P-polarized light.

Correspondingly, a structure of the second birefringent lens 132 is the same as that of the first birefringent lens 131, except for that a refractive index of a second birefringent material in the second birefringent lens 132 with regard to the P-polarized light is greater than a refractive index of the second birefringent material with regard to the S-polarized light. A refractive index of a second filling material in the second birefringent lens 132 is equal to the refractive index with regard to the S-polarized light. Therefore, the second birefringent lens 132 only refracts the P-polarized light but does not refract the S-polarized light.

The scattering component 14 includes a polymer dispersed liquid crystal component 141 and a voltage control unit 142, wherein the voltage control unit 142 is electrically connected to the polymer dispersed liquid crystal component 141 and the system control unit 111, respectively, to control the polymer dispersed liquid crystal component 141 to perform state switching on the basis of the preset timing under the control of the system control unit 111, the state includes a transparent state or a scattering state.

The polymer dispersed liquid crystal component 141 includes a first polymer dispersed liquid crystal member 1411 and a second polymer dispersed liquid crystal member 1412 arranged in parallel to each other, wherein the first birefringent lens 131 is configured to image a first to-be-displayed image light of which is converted into the S-polarized light on the first polymer dispersed liquid crystal member 1411, and the second birefringent lens 132 is configured to image a second to-be-displayed image light of which is converted into the P-polarized light on the second polymer dispersed liquid crystal member 1412.

When light incident to the birefringent lens component 13 is the S-polarized light, the first birefringent lens 131 in the birefringent lens component 13 refracts the S-polarized light, and the system control unit 111 controls the voltage control unit 142 to switch a state of the first polymer dispersed liquid crystal member 1411 to the scattering state, the first to-be-displayed image which has been converted into the S-polarized light can be imaged on the first polymer dispersed liquid crystal member 1411 by the first birefringent lens 131 to form an object surface of a first projection plane; at this time, the second birefringent lens 132 does not refract the S-polarized light, the S-polarized light does not deflect when passing through the second birefringent lens 132, and at the same time, a state of the second polymer dispersed liquid crystal member 1412 is set to be the transparent state and has no effect on light passing therethrough.

When light incident to the birefringent lens component 13 is the P-polarized light, the second birefringent lens 132 in the birefringent lens component 13 refracts the P-polarized light, and the system control unit 111 controls the voltage control unit 142 to switch the state of the second polymer dispersed liquid crystal member 1412 to the scattering state, the second to-be-displayed image which has been converted into the P-polarized light can be imaged on the second polymer dispersed liquid crystal member 1412 by the second birefringent lens 132 to form an object surface of a second projection plane; at this time, the first birefringent lens 131 does not refract the P-polarized light, and the P-polarized light does not deflect when passing through the first birefringent lens 131, meanwhile, the state of the first polymer dispersed liquid crystal member 1411 is set to be the transparent state and has no effect on light passing therethrough.

It should be noted that the first polymer dispersed liquid crystal member 1411 and the second polymer dispersed liquid crystal member 1412 are provided to ensure that the first birefringent lens 131 can image the S-polarized light on the first polymer dispersed liquid crystal member 1411, and the second birefringent lens 132 can image the P-polarized light on the second polymer dispersed liquid crystal member 1412.

For example, during a first time period of a display cycle, the polarization conversion member 12 converts the light of the first to-be-displayed image into the S-polarized light, and the S-polarized light is incident to the birefringent lens component 13, and the first birefringent lens 131 in the birefringent lens component 13 refracts the S-polarized light. The system control unit 111 controls the voltage control unit 142 to switch the state of the first polymer dispersed liquid crystal member 1411 to the scattering state, then the first to-be-displayed image which has been converted into the S-polarized light can be imaged on the first polymer dispersed liquid crystal member 1411 by the first birefringent lens 131 to form the object surface of the first projection plane; and during a second time period of a display cycle, the polarization conversion member 12 converts the light of the second to-be-displayed image into the P-polarized light and the P-polarized light is incident to the birefringent lens component 13, and the second birefringent lens 132 in the birefringent lens component 13 refracts the P-polarized light, and the system control unit 111 controls the voltage control unit 142 to switch the state of the second polymer dispersed liquid crystal member 1412 to the scattering state, and then the second to-be-displayed image which has been converted to the P-polarized light can be imaged on the second polymer dispersed liquid crystal member 1412 by the second birefringent lens 132 to form the object surface of the second projection plane.

Figure 3:
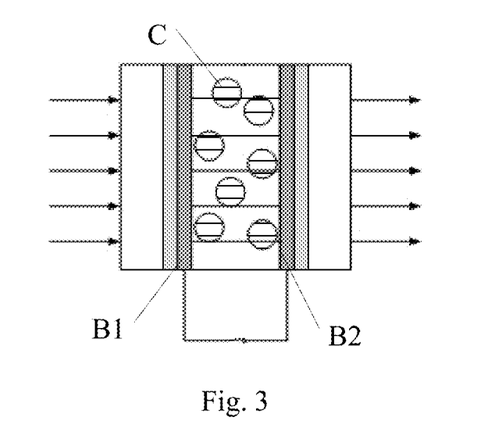
FIG. 3 is a schematic diagram illustrating that a state of a polymer dispersed liquid crystal member is a transparent state according to an embodiment of the present disclosure.

FIG. 3 is a schematic diagram illustrating that a state of a polymer dispersed liquid crystal member is a transparent state according to an embodiment of the present disclosure.

Structures of a first polymer dispersed liquid crystal member 1411 and a second polymer dispersed liquid crystal member 1412 in the embodiment of the present disclosure are as shown in FIG. 3, and transparent electrodes B1 and B2 are respectively disposed on opposite surfaces of two substrates and a Polymer Dispersed Liquid Crystal (PDLC) layer C is disposed between the transparent electrodes B1 and B2.

When the transparent electrode B1 and the transparent electrode B2 are energized, the state of the polymer dispersed liquid crystal member is the transparent state, and the PDLC layer between the transparent electrode B1 and the transparent electrode B2 forms a medium and transparent uniform, and when light passes through the polymer dispersed liquid crystal member, no scattering occurs.

Figure 4:
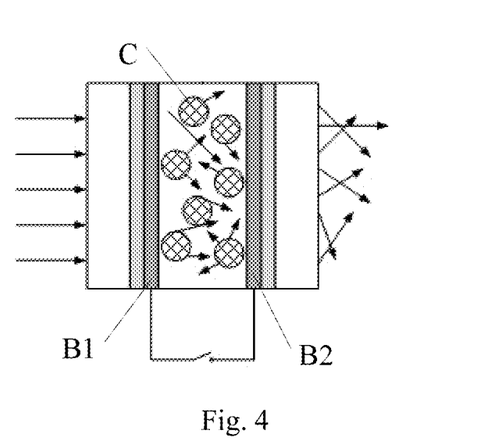
FIG. 4 is a schematic diagram illustrating that a state of a polymer dispersed liquid crystal member is a scattering state according to an embodiment of the present disclosure.

FIG. 4 is a schematic diagram illustrating that a state of a polymer dispersed liquid crystal member is a scattering state according to an embodiment of the present disclosure.

When transparent electrodes B1 and B2 are deenergized, the state of the polymer dispersed liquid crystal member is the scattering state, and incident light is scattered by a PDLC layer, at this time, the polymer dispersed liquid crystal member performs the function of a diffusion plate.

The scattering component 14 scatters the object surface of the first projection plane and the object surface of the second projection plane onto the reflecting component 15 respectively. The reflecting component 15 includes a first reflector 151, a second reflector 152, and a third reflector 153, wherein the first reflector 151 is configured to reflect the object surface of the first projection plane and the object surface of the second projection plane, which are scattered onto the first reflector 151, to the second reflector 152; the second reflector 152 is configured to reflect light emitted from the first reflector 151 to the third reflector 153; and the third reflector 153 is configured to reflect light emitted from the second reflector 152 to the eye 16 of a user.

For example, during a first time period of a display cycle, the first to-be-displayed image which has been converted into the S-polarized light is imaged on the first polymer dispersed liquid crystal member 1411 by the first birefringent lens 131 to form the object surface of the first projection plane, the first polymer dispersed liquid crystal member 1411 scatters the object surface of the first projection plane to the first reflector 151, the first reflector 151 reflects the incident light to the second reflector 152, and the second reflector 152 reflects the light emitted from the first reflector 151 to the third reflector 153, and then the third reflector 153 reflects the light emitted from the second reflector 152 to the eye 16 of a user, and provides the eye 16 of a user with a display image formed on the first projection plane M1; and during a second time period of a display cycle, the second to-be-displayed image which has been converted into the P-polarized light is imaged on the second polymer dispersed liquid crystal member 1412 by the second birefringent lens 132 to form the object surface of the second projection plane, the second polymer dispersed liquid crystal member 1412 scatters the object surface of the second projection plane to the first reflector 151, and then is reflected by the first reflector 151, the second reflector 152, and the third reflector 153 to the eye 16 of a user, to provide the eye 16 of a user a display image formed on the second projection plane M2.

It should be noted that the third reflector 153 is a windshield or a synthesizer, which can be appreciated as a reflecting glass. The reflecting component 15 can include the first reflector 151, the second reflector 152 and the third reflector 153, and certainly can be composed of other reflectors. The embodiment of the present disclosure does not impose any limitations on shape and the number of the reflectors.

A time division multiplexing method is adopted, and the polarization conversion member and the birefringent lens component cooperate with each other to synchronously control the states of the first polymer dispersed liquid crystal member and the second polymer dispersed liquid crystal member, so that a display member can realize the function of the light field display. A high-refresh-rate display member is used for time-division multiplexing, the polarization conversion member is used to convert light of different polarization states, and the birefringent lens is used to image only light of a certain polarization state, and the scattering state and the transparent state of the polymer dispersed liquid crystal component are switched dinamially and cooperatively, and a state switching speed of the display member, the polarization conversion member, and the polymer dispersed liquid crystal members are far greater than a refresh frequency of an eye of a user, so the user may simultaneously see the display images on the first projection plane and the second projection plane.

The image rendering unit renders the display images on two projection planes at certain intervals in space, and through depth fusion, a position of a depth perception plane of a driver changes so as to form a light field display. Such light field display may realistically reproduce three-dimensional objects, such that display information of a head-up display system more realistic, and meanwhile eye discomfort caused by the driver's long-term focus on the same depth plane is avoided.

In the embodiment of the present disclosure, the first to-be-displayed image and the second to-be-displayed image are alternately outputted to the polarization conversion member on the basis of the preset timing by the display control component, and the polarization conversion member converts the light of the first to-be-displayed image into the S-polarized light, and converts the light of the second to-be-displayed image into the P-polarized light so as to be incident to the birefringent lens component, and the birefringent lens component images the first to-be-displayed image which has been converted into the S-polarized light on the scattering component to form the object surface of the first projection plane, and images the second to-be-displayed image which has been converted into the P-polarized light on the scattering component to form the object surface of the second projection plane, and the scattering component scatters the object surface of the first projection plane and the object surface of the second projection plane to the reflecting component respectively, and the reflecting component is configured to reflect the object surface of the first projection plane and the object surface of the second projection plane, which are scattered onto the reflecting component, to the eye of a user. The polarization conversion member performs conversion of light having different polarization states, and by utilizing the characteristics of the birefringent lens component of imaging the light of the S-polarization state and the P-polarization state, and also the scattering effect of the scattering component, the simultaneous display of the images of the first projection plane and the second projection plane is realized, also the light field display is realized through depth fusion of the images of the two projection planes, and focus adjustment of the eyes of a driver within a certain depth range is provided, and a natural 3D image is presented, in this way, the displayed images are more realistic, and eye fatigue caused by the driver's long-term view is avoided.

FIG. 5 is a flow chart showing a method for controlling a head-up display system according to an embodiment of the present disclosure. Referring to FIG. 5, the method can specifically include the following steps:

In step 501, in a display cycle, a first to-be-displayed image and a second to-be-displayed image are alternately outputted to a polarization conversion member on the basis of a preset timing.

In the embodiment of the present disclosure, the head-up display system includes a light field display mode, which can be interpreted as a 3D display mode, and a 2D display mode.

When a user chooses the light field display mode, the first to-be-displayed image and the second to-be-displayed image are alternately outputted to the polarization conversion member 12 on the basis of the preset timing in a display cycle.

Specifically, the image rendering unit 112 receives first to-be-displayed image data and second to-be-displayed image data inputted from an external system, the first to-be-displayed image is rendered according to the first to-be-displayed image data, and the second to-be-displayed image is rendered according to the second to-be-displayed image data. The system control unit 111 controls the image rendering unit 112 to alternately send the rendered first to-be-displayed image and second to-be-displayed image to the display member 113 on the basis of a preset timing, and the display member 113 alternately displays the first to-be-displayed image and the second to-be-displayed image on the basis of a preset timing, and alternately outputs the first to-be-displayed image and the second to-be-displayed image to the polarization conversion member 12.

In step 502, during a first time period of the display cycle, light of the first to-be-displayed image is converted into S-polarized light by passing through the polarization conversion member, and the first to-be-displayed image which has been converted into the S-polarized light is imaged on a scattering component by a birefringent lens component to form an object surface of a first projection plane, and the object surface of the first projection plane is scattered by the scattering component onto a reflecting component, and the object surface of the first projection plane, which is scattered onto the reflecting component, is reflected by the reflecting component to an eye of a user to provide the eye of a user with a display image formed on the first projection plane.

In the embodiment of the present disclosure, during the first time period of the display cycle, the system control unit 111 switches a polarization state of the polarization conversion member 12 to a S-polarization state so that the light of the first to-be-displayed image is converted to the S-polarized light by passing through the polarization conversion member 12; the first to-be-displayed image which has been converted into the S-polarized light is imaged on the scattering component 14 by the birefringent lens component 13 to form the object surface of the first projection plane, and the object surface of the first projection plane is scattered by the scattering component 14 onto the reflecting component 15, and then the object surface of the first projection plane, which is scattered onto the reflecting component 15 is reflected by the reflecting component 15 to the eye 16 of a user to provide the eye 16 of a user with a display image formed on a first projection plane M1.

The birefringent lens component 13 includes a first birefringent lens 131 and a second birefringent lens 132 disposed in parallel to each other; the scattering component 14 includes a polymer dispersed liquid crystal component 141 and a voltage control unit 142, and the polymer dispersed liquid crystal component 141 includes a first polymer dispersed liquid crystal member 1411 and a second polymer dispersed liquid crystal member 1412 that are disposed in parallel to each other; when light incident to the first birefringent lens 131 is S-polarized light, a state of the first polymer dispersed liquid crystal member 1411 is set as a scattering state, and a state of the second polymer dispersed liquid crystal member 1412 is set as a transparent state, and when light incident to the second birefringent lens 132 is P-polarized light, the state of the first polymer dispersed liquid crystal member 1411 is set as the transparent state, and the state of the second polymer dispersed liquid crystal member 1412 is set as the scattering state.

When the voltage control unit 142 inputs a voltage signal to the first polymer dispersed liquid crystal member 1411 and the second polymer dispersed liquid crystal member 1412, the states of the first polymer dispersed liquid crystal member 1411 and the second polymer dispersed liquid crystal member 1412 are the transparent state (as shown in FIG. 3); and when the voltage control unit 142 does not input any voltage signal to the first polymer dispersed liquid crystal member 1411 and the second polymer dispersed liquid crystal member 1412, the states of the first polymer dispersed liquid crystal member 1411 and the second polymer dispersed liquid crystal member 1412 are the scattering state (as shown in FIG. 4).

Specifically, the polarization conversion member 12 converts the light of the first to-be-displayed image into the S-polarized light, to be incident to the first birefringent lens 131, and the system control unit 111 controls the voltage control unit 142 to switch the state of the first polymer dispersed liquid crystal member 1411 to the scattering state, and then the first to-be-displayed image which has been converted into the S-polarized light can be imaged on the first polymer dispersed liquid crystal member 1411 by the first birefringent lens 131 to form the object surface of the first projection plane; meanwhile, the state of the second polymer dispersed liquid crystal member 1412 is set as the transparent state. Then, the first polymer dispersed liquid crystal member 1411 scatters the object surface of the first projection plane to the first reflector 151, the first reflector 151 reflects the incident light to the second reflector 152, and the second reflector 152 reflects the light emitted from the first reflector 151 to the third reflector 153, and the third reflector 153 reflects the light emitted from the second reflector 152 to the eye 16 of a user, to provide the eye 16 of a user with a display image formed on the first projection plane M1.

In step 503, during a second time period of the display cycle, the light of the second to-be-displayed image is converted into the P-polarized light by the polarization conversion member, and the second to-be-displayed image which has been converted into the P-polarized light is imaged on the scattering component by the birefringent lens component to form an object surface of a second projection plane, and the object surface of the second projection plane is scattered onto the reflecting component by the scattering component, and the object surface of the second projection plane, which is scattered onto the reflecting component, is reflected by the reflecting component to the eye of a user to provide the eye of a user with a display image formed on the second projection plane.

In the embodiment of the present disclosure, during the second time period of the display cycle, the system control unit 111 switches the polarization state of the polarization conversion member 12 to a P-polarization state so that the light of the second to-be-displayed image is converted into the P-polarized light by the polarization conversion member 12; the second to-be-displayed image which has been converted into the P-polarized light is imaged on the scattering component 14 by the birefringent lens component 13 to form the object surface of the second projection plane, and the object surface of the second projection plane is scattered to the reflecting component 15 by the scattering component 14, the object surface of the second projection plane scattered to the reflecting component 15 is reflected by the reflecting component 15 to the eye 16 of a user to provide the eye of a user with a display image formed on a second projection plane M2.

Specifically, the polarization conversion member 12 converts the light of the second to-be-displayed image into the P-polarized light to be incident to the second birefringent lens 132, and the system control unit 111 controls the voltage control unit 142 to switch the state of the second polymer dispersed liquid crystal member 1412 to the scattering state, and then the second to-be-displayed image which has been converted into the P-polarized light can be imaged on the second polymer dispersed liquid crystal member 1412 by the second birefringent lens 132 to form the object surface of the second projection plane; meanwhile, the state of the first polymer dispersed liquid crystal member 1411 is set to be the transparent state. Then, the second polymer dispersed liquid crystal member 1412 scatters the object surface of the second projection plane to the first reflector 151 and is reflected by the first reflector 151, the second reflector 152, and the third reflector 153 to the eye 16 of a user, to provide the eye 16 of a user with a display image formed on the second projection plane M2.

In order to enable a user to view the display images of the first projection plane and the second projection plane at the same time, the display cycle in the embodiment of the present disclosure should be less than a refresh time of an eye of a user, and the refresh time of the eye of a user is generally 1/30 second, therefore, the display cycle is less than 1/30 second.

When the user chooses the 2D display mode, the eye of a user can be provided with the display image formed on the first projection plane or the display image formed on the second projection plane.

In an embodiment of the present disclosure, in the 2D display mode, a first to-be-displayed image is outputted to the polarization conversion member; light of the first to-be-displayed image is converted into S-polarized light by the polarization conversion member; the first to-be-displayed image which has been converted into the S-polarized light is imaged on the scattering component by the birefringent lens component to form an object surface of a first projection plane; and the object surface of the first projection plane is scattered to the reflecting component by the scattering component; and then the object surface of the first projection plane scattered to the reflecting component is reflected by the reflecting component to the eye of a user to provide the eye of a user with a display image formed on the first projection plane.

The system control unit 111 controls the image rendering unit 112 to send the rendered first to-be-displayed display image to the display member 113, and the display member 113 outputs the first to-be-displayed image to the polarization conversion member 12; the system control unit 111 switches the polarization state of the polarization conversion member 12 to the S-polarization state so that the light of the first to-be-displayed image is converted into the S-polarized light by the polarization conversion member 12; the system control unit 111 controls the voltage control unit 142 to switch the state of the first polymer dispersed liquid crystal member 1411 to the scattering state, and the first to-be-displayed image which has been converted into the S-polarized light can be imaged on the first polymer dispersed liquid crystal member 1411 by the first birefringent lens 131 to form the object surface of the first projection plane; and the first polymer dispersed liquid crystal member 1411 scatters the object surface of the first projection plane to the first reflector 151, and is reflected to the eye 16 of a user by the first reflector 151, the second reflector 152, and the third reflector 153, to provide the eye 16 of a user with the display image formed on the first projection plane M1.

For example, the first projection plane that is farther away from the driver's eyes can display augmented reality information, such as indication information of foreign objects, navigation knowledge information, and the like.

In another embodiment of the present disclosure, in the 2D display mode, the second to-be-displayed image is outputted to the polarization conversion member; light of the second to-be-displayed image is converted into P-polarized light by the polarization conversion member; the second to-be-displayed image which has been converted into the P-polarized light is imaged on the scattering component by the birefringent lens component to form an object surface of a second projection plane; and the object surface of the second projection plane is scattered to the reflecting component by the scattering component; and then the object surface of the second projection plane scattered to the reflecting component is reflected by the reflecting component to the eye of a user to provide the eye of a user with a display image formed on the second projection plane.

The system control unit 111 controls the image rendering unit 112 to send the rendered second to-be-displayed image to the display member 113, and the display member 113 outputs the second to-be-displayed image to the polarization conversion member 12; the system control unit 111 switches the polarization state of the polarization conversion member 12 to the P-polarization state so that the light of the second to-be-displayed image is converted into P-polarized light by the polarization conversion member 12; the system control unit 111 controls the voltage control unit 142 to switch the state of the second polymer dispersed liquid crystal member 1412 to the scattering state, and the second to-be-displayed image which has been converted into the P-polarized light can be imaged on the second polymer dispersed liquid crystal member 1412 by the second birefringent lens 132 to form the object surface of the second projection plane; the second polymer dispersed liquid crystal member 1412 scatters the object surface of the second projection plane to the first reflector 151, to be reflected by the first reflector 151, the second reflector 152, and the third reflector 153 to the eye 16 of a user, to provide the eye 16 of a user with a display image formed on the second projection plane M2.

For example, the second projection plane, which is closer to the driver's eyes, can display vehicle state information, such as vehicle speed, oil temperature, water temperature, and the like.

In the embodiment of the present disclosure, the polarization conversion member performs conversion of light having different polarization states, and by utilizing the characteristics of the birefringent lens component of imaging the light of the S-polarization state and the P-polarization state, and also the scattering effect of the scattering component, the simultaneous display of the images of the first projection plane and the second projection plane is realized, also the light field display is realized through depth fusion of the images of the two projection planes, and focus adjustment of the eyes of the driver within a certain depth range is provided, and a natural 3D image is presented, in this way, the displayed images are more realistic, and eye fatigue caused by the driver's long-term view is avoided.

Those skilled in the art can understand that the system control unit, the image rendering unit and the voltage control unit in the above embodiments can perform their functions through a processor and program. Their functions can be implemented by using different processors and corresponding programs respectively or using one processor and program.

For the foregoing method embodiments, for the sake of simple description, the embodiments are all expressed as a series of action combinations, but those skilled in the art should know that the present disclosure is not limited by the order of the actions described herein, it is because that according to the present disclosure, some steps can be performed in other orders or simultaneously. Secondly, those skilled in the art should also understand that the embodiments described in the description are all preferred embodiments, and the involved actions and modules are not necessarily required by the present disclosure.

The embodiments in the description are described in a progressive manner, and each of the embodiments focuses on differences from other embodiments, and the same or similar parts among the embodiments can be referred to each other.

Finally, it should also be noted that, in this text, relational terms such as first and second, etc., are only used to distinguish one entity or operation from another entity or operation, and do not necessarily require or imply any such actual relations or orders present between these entities or operations. Moreover, the terms "including", "comprising" or any other variations thereof are intended to cover a non-exclusive inclusion such that processes, methods, articles, or devices that comprise a series of elements include not only those elements but also include other elements that are not explicitly listed. Alternatively, elements inherent to such processes, methods, articles, or devices may also be included. In case of no more limitations, an element defined by phase "including a . . . " does not exclude the situation where additional identical elements are present in the processes, the methods, the articles, or the devices including the element.

A head-up display system and a method for controlling the same provided by the present disclosure are described in detail above. Specific examples are used herein to describe the principles and embodiments of the present disclosure. The description of the embodiments above is only intended to help the understanding of the method and its core idea of the present disclosure; meanwhile, those of ordinary skill in the art, according to the idea of the present disclosure, will make changes in the specific embodiments and application ranges. In summary, the contents of this description should not be constructed as limiting the present disclosure.

What is claimed is:

1. A head-up display system, comprising: a display control component, a polarization conversion member, a birefringent lens component, a scattering component, and a reflecting component; wherein
   the display control component is configured to alternately output a first to-be-displayed image and a second to-be-displayed image to the polarization conversion member on the basis of a preset timing;
   the polarization conversion member is configured to convert light of the first to-be-displayed image into S-polarized light, and convert light of the second to-be-displayed image into P-polarized light to be incident to the birefringent lens component;
   the birefringent lens component is configured to image the first to-be-displayed image that has been converted into the S-polarized light on the scattering component to form an object surface of a first projection plane, and image the second to-be-displayed image that has been converted into the P-polarized light on the scattering component to form an object surface of a second projection plane;
   the scattering component is configured to scatter the object surface of the first projection plane and the object surface of the second projection plane onto the reflecting component, respectively;
   the reflecting component is configured to reflect the object surface of the first projection plane and the object surface of the second projection plane, which are scattered onto the reflecting component, to an observation point;
   the birefringent lens component comprises a first birefringent lens and a second birefringent lens disposed parallel to the first birefringent lens; optical axises of crystal of the first birefringent lens and the second birefringent lens are perpendicular to each other, and the first birefringent lens refracts the S-polarized light, and the second birefringent lens refracts the P-polarized light; and the first projection plane and the second projection plane are spaced apart from each other at a certain distance in space, a natural 3D display mode is achieved by depth fusion of display images of the first projection plane and the second projection plane, in a 2D display mode, distance between the first projection plane and a driver's eyes is greater than the distance between the second projection plane and the driver's eyes, the first projection plane displays augmented reality information, the second projection plane displays vehicle state information.

2. The head-up display system according to claim 1, wherein the display control component comprises a system control unit, an image rendering unit and a display member; the system control unit is electrically connected to the image rendering unit, and the image rendering unit is electrically connected to the display member;
the image rendering unit is configured to render the first to-be-displayed image according to first to-be-displayed image data, and to render the second to-be-displayed image according to second to-be-displayed image data;
the system control unit is configured to control the image rendering unit to alternately send the first to-be-displayed image and the second to-be-displayed image to the display member on the basis of the preset timing; and
the display member is configured to alternately output the first to-be-displayed image and the second to-be-displayed image.

3. The head-up display system according to claim 2, wherein the system control unit is further electrically connected to the polarization conversion member, and is configured to control the polarization conversion member to switch a polarization state on the basis of the preset timing, and the polarization state comprises a S-polarization state or a P-polarization state.

4. The head-up display system according to claim 3, wherein the scattering component comprises a polymer dispersed liquid crystal component and a voltage control unit;
the voltage control unit is electrically connected to the polymer dispersed liquid crystal component and the system control unit, respectively, for controlling the polymer dispersed liquid crystal component to switch a state on the basis of the preset timing under the control of the system control unit, the state comprising a transparent state or a scattering state.

5. The head-up display system according to claim 4, wherein the polymer dispersed liquid crystal component comprises a first polymer dispersed liquid crystal member and a second polymer dispersed liquid crystal member disposed parallel to the first polymer dispersed liquid crystal member,
the first birefringent lens is configured to image the first to-be-displayed image that has been converted into the S-polarized light on the first polymer dispersed liquid crystal member, and the second birefringent lens is configured to image the second to-be-displayed image that has been converted into the P-polarized light on the second polymer dispersed liquid crystal member.

6. The head-up display system according to claim 5, wherein the reflecting component comprises a first reflector, a second reflector, and a third reflector;
the first reflector is configured to reflect the object surface of the first projection plane and the object surface of the second projection plane, which are scattered onto the first reflector, to the second reflector;
the second reflector is configured to reflect the light emitted from the first reflector to the third reflector; and
the third reflector is configured to reflect the light emitted from the second reflector to the observation point.

7. The head-up display system according to claim 4, wherein the reflecting component comprises a first reflector, a second reflector, and a third reflector;
the first reflector is configured to reflect the object surface of the first projection plane and the object surface of the second projection plane, which are scattered onto the first reflector, to the second reflector;
the second reflector is configured to reflect the light emitted from the first reflector to the third reflector; and
the third reflector is configured to reflect the light emitted from the second reflector to the observation point.

8. The head-up display system according to claim 3, wherein the reflecting component comprises a first reflector, a second reflector, and a third reflector;
the first reflector is configured to reflect the object surface of the first projection plane and the object surface of the second projection plane, which are scattered onto the first reflector, to the second reflector;
the second reflector is configured to reflect the light emitted from the first reflector to the third reflector; and
the third reflector is configured to reflect the light emitted from the second reflector to the observation point.

9. The head-up display system according to claim 2, wherein the reflecting component comprises a first reflector, a second reflector, and a third reflector;
the first reflector is configured to reflect the object surface of the first projection plane and the object surface of the second projection plane, which are scattered onto the first reflector, to the second reflector;
the second reflector is configured to reflect the light emitted from the first reflector to the third reflector; and
the third reflector is configured to reflect the light emitted from the second reflector to the observation point.

10. The head-up display system according to claim 1, wherein the reflecting component comprises a first reflector, a second reflector, and a third reflector;
the first reflector is configured to reflect the object surface of the first projection plane and the object surface of the second projection plane, which are scattered onto the first reflector, to the second reflector;
the second reflector is configured to reflect the light emitted from the first reflector to the third reflector; and
the third reflector is configured to reflect the light emitted from the second reflector to the observation point.

11. A method for controlling a head-up display system, the head-up display system comprising a display control component, a polarization conversion member, a birefringent lens component, a scattering component, and a reflecting component, the method comprising:
in a display cycle, alternately outputting a first to-be-displayed image and a second to-be-displayed image to a polarization conversion member on the basis of a preset timing;
during a first time period of the display cycle, converting light of the first to-be-displayed image into S-polarized light by the polarization conversion member, imaging the first to-be-displayed image which has been converted into the S-polarized light on a scattering component by a birefringent lens component, to form an object surface of a first projection plane, scattering the object surface of the first projection plane onto a reflecting component by the scattering component, and reflecting the object surface of the first projection plane, which is scattered onto the reflecting component, to an observation point by the reflecting component to provide the observation point with a display image formed on the first projection plane;

during a second time period of the display cycle, converting light of the second to-be-displayed image into P-polarized light by the polarization conversion member, imaging the second to-be-displayed image which has been converted into the P-polarized light on the scattering component by the birefringent lens component, to form an object surface of a second projection plane, scattering the object surface of the second projection plane onto the reflecting component by the scattering component, and reflecting the object surface of the second projection plane, which is scattered onto the reflecting component, to the observation point by the reflecting component to provide the observation point with a display image formed on the second projection plane;

the birefringent lens component comprises a first birefringent lens and a second birefringent lens disposed parallel to the first birefringent lens; optical axises of crystal of the first birefringent lens and the second birefringent lens are perpendicular to each other, and the first birefringent lens refracts the S-polarized light, and the second birefringent lens refracts the P-polarized light; and wherein the first projection plane and the second projection plane are spaced apart from each other at a certain distance in space, a natural 3D display mode is achieved by depth fusion of display images of the first projection plane and the second projection plane, in a 2D display mode, distance between the first projection plane and a driver's eyes is greater than the distance between the second projection plane and the driver's eyes, the first projection plane displays augmented reality information, the second projection plane displays vehicle state information.

12. The method according to claim 11, further comprising:

outputting the first to-be-displayed image to the polarization conversion member in a 2D display mode;

converting the light of the first to-be-displayed image into the S-polarized light by the polarization conversion member;

imaging the first to-be-displayed image that has been converted into the S-polarized light on the scattering component by the birefringent lens component, to form the object surface of the first projection plane;

scattering the object surface of the first projection plane onto the reflecting component by the scattering component; and reflecting the object surface of the first projection plane, which is scattered onto the reflecting component, to the observation point by the reflecting component to provide the observation point with the display image formed on the first projection plane.

13. The method according to claim 12, wherein the scattering component comprises a polymer dispersed liquid crystal component and a voltage control unit, wherein the polymer dispersed liquid crystal component comprises a first polymer dispersed liquid crystal member and a second polymer dispersed liquid crystal member disposed parallel to the first polymer dispersed liquid crystal member;

when light incident to the first birefringent lens is the S-polarized light, a state of the first polymer dispersed liquid crystal member is set as a scattering state, and a state of the second polymer dispersed liquid crystal member is set as a transparent state; and when light incident to the second birefringent lens is the P-polarized light, the state of the first polymer dispersed liquid crystal member is set as the transparent state, and the state of the second polymer dispersed liquid crystal member is set as the scattering state.

14. The method according to claim 11, further comprising:

outputting the second to-be-displayed image to the polarization conversion member in a 2D display mode;

converting the light of the second to-be-displayed image into the P-polarized light by the polarization conversion member;

imaging the second to-be-displayed image that has been converted into the P-polarized light on the scattering component by the birefringent lens component, to form the object surface of the second projection plane;

scattering the object surface of the second projection plane onto the reflecting component by the scattering component; and reflecting the object surface of the second projection plane, which is scattered onto the reflecting component, to the observation point by the reflecting component to provide the observation point with the display image formed on the second projection plane.

15. The method according to claim 14, wherein the scattering component comprises a polymer dispersed liquid crystal component and a voltage control unit, wherein the polymer dispersed liquid crystal component comprises a first polymer dispersed liquid crystal member and a second polymer dispersed liquid crystal member disposed parallel to the first polymer dispersed liquid crystal member;

when light incident to the first birefringent lens is the S-polarized light, a state of the first polymer dispersed liquid crystal member is set as a scattering state, and a state of the second polymer dispersed liquid crystal member is set as a transparent state; and when light incident to the second birefringent lens is the P-polarized light, the state of the first polymer dispersed liquid crystal member is set as the transparent state, and the state of the second polymer dispersed liquid crystal member is set as the scattering state.

16. The method according to claim 11, the scattering component comprises a polymer dispersed liquid crystal component and a voltage control unit, wherein the polymer dispersed liquid crystal component comprises a first polymer dispersed liquid crystal member and a second polymer dispersed liquid crystal member disposed parallel to the first polymer dispersed liquid crystal member;

when light incident to the first birefringent lens is the S-polarized light, a state of the first polymer dispersed liquid crystal member is set as a scattering state, and a state of the second polymer dispersed liquid crystal member is set as a transparent state; and when light incident to the second birefringent lens is the P-polarized light, the state of the first polymer dispersed liquid crystal member is set as the transparent state, and the state of the second polymer dispersed liquid crystal member is set as the scattering state.

17. The method according to claim 16, wherein when the voltage control unit inputs a voltage signal to the first polymer dispersed liquid crystal member and the second polymer dispersed liquid crystal member, the states of the first polymer dispersed liquid crystal member and the second polymer dispersed liquid crystal member are the transparent state; and when the voltage control unit does not input any voltage signal to the first polymer dispersed liquid crystal member and the second polymer dispersed liquid crystal member, the states of the first polymer dispersed liquid crystal member and the second polymer dispersed liquid crystal member are the scattering state.

18. The method according to claim 11, wherein the display cycle is less than 1/30 second.

* * * * *